(12) United States Patent
Katano et al.

(10) Patent No.: US 10,259,516 B2
(45) Date of Patent: Apr. 16, 2019

(54) FUEL CELL VEHICLE AND METHOD OF MOUNTING POWER MODULE ON FUEL CELL VEHICLE

(71) Applicant: TOYOTA JIDOSHA KABUSHIKI KAISHA, Toyota-shi, Aichi-ken (JP)

(72) Inventors: Koji Katano, Toyota (JP); Tsutomu Shirakawa, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 217 days.

(21) Appl. No.: 15/454,054

(22) Filed: Mar. 9, 2017

(65) Prior Publication Data
US 2017/0267301 A1    Sep. 21, 2017

(30) Foreign Application Priority Data

Mar. 15, 2016    (JP) .................................. 2016-050510

(51) Int. Cl.
| | | |
|---|---|---|
| *B60K 1/00* | (2006.01) | |
| *B60K 1/04* | (2006.01) | |
| *B62D 65/02* | (2006.01) | |
| *B60L 11/18* | (2006.01) | |

(Continued)

(52) U.S. Cl.
CPC .............. *B62D 65/02* (2013.01); *B60K 1/00* (2013.01); *B60K 1/04* (2013.01); *B60L 11/1898* (2013.01); *H01M 8/04746* (2013.01); *H01M 8/04932* (2013.01); *H01M 8/04952* (2016.02); *B60K 2001/001* (2013.01); *B60K 2001/0411* (2013.01); *B60K 2001/0416* (2013.01); *B60K 2001/0433* (2013.01); *B60Y 2200/92* (2013.01);

(Continued)

(58) Field of Classification Search
CPC .............. B62D 65/02; H01M 8/04952; H01M 8/04746; H01M 8/04932; H01M 2250/20; B60K 1/00; B60K 1/04; B60K 2001/001; B60K 2001/0433; B60K 2001/0416; B60K 2001/0411; B60L 11/1898; B60Y 2200/92; B60Y 2400/202
See application file for complete search history.

(56) References Cited

U.S. PATENT DOCUMENTS

2002/0189873 A1   12/2002 Mizuno
2005/0181247 A1*  8/2005 Foger ................ H01M 8/04014
                                                 429/425

(Continued)

FOREIGN PATENT DOCUMENTS

| JP | 2002-370544 | 12/2002 |
|---|---|---|
| JP | 2007-099239 | 4/2007 |

(Continued)

*Primary Examiner* — Erez Gurari
(74) *Attorney, Agent, or Firm* — Finnegan, Henderson, Farabow, Garrett & Dunner, LLP (57) ABSTRACT

A fuel cell vehicle includes a high voltage apparatus for a fuel cell, a compressor for an air conditioner disposed under the high voltage apparatus for the fuel cell and constituting a module integrated with the high voltage apparatus for the fuel cell, and a power control unit separated from the high voltage apparatus for the fuel cell, disposed at a vehicle body over the compressor and configured to control an operation of a motor. The compressor and the high voltage apparatus for the fuel cell are connected by a single power wiring.

11 Claims, 8 Drawing Sheets

(51) Int. Cl.
 *H01M 8/04858* (2016.01)
 *H01M 8/04746* (2016.01)

(52) U.S. Cl.
 CPC .... *B60Y 2400/202* (2013.01); *H01M 2250/20* (2013.01); *Y02T 90/32* (2013.01)

(56) References Cited

U.S. PATENT DOCUMENTS

| | | | | |
|---|---|---|---|---|
| 2005/0230164 | A1* | 10/2005 | Uozumi | B60K 1/04 180/89.1 |
| 2006/0289224 | A1* | 12/2006 | Ono | B60K 1/04 180/311 |
| 2007/0007060 | A1* | 1/2007 | Ono | B60K 1/04 180/65.31 |
| 2013/0008733 | A1 | 1/2013 | Gleyzes et al. | |
| 2014/0110185 | A1* | 4/2014 | Naito | B60L 3/0007 180/65.31 |
| 2014/0113161 | A1 | 4/2014 | Katano | |
| 2015/0280262 | A1* | 10/2015 | Hoshi | H01M 8/04029 429/429 |
| 2016/0193991 | A1* | 7/2016 | Apelsmeier | B60H 1/004 701/22 |
| 2016/0347200 | A1* | 12/2016 | Matsusue | H01M 8/043 |
| 2017/0036514 | A1* | 2/2017 | Umehara | B60H 1/00278 |
| 2017/0101031 | A1* | 4/2017 | Ohashi | H01M 8/04201 |
| 2017/0117564 | A1* | 4/2017 | Hatakeda | H01M 8/04201 |
| 2017/0253126 | A1* | 9/2017 | Katano | B60L 3/00 |
| 2017/0267301 | A1* | 9/2017 | Katano | B60K 1/04 |
| 2017/0305252 | A1* | 10/2017 | Imanishi | B60L 11/18 |
| 2018/0097244 | A1* | 4/2018 | Fujimori | H01M 8/04223 |
| 2018/0151901 | A1* | 5/2018 | Janarthanam | H01M 8/04089 |
| 2018/0229622 | A1* | 8/2018 | Matsumoto | H02M 3/155 |
| 2018/0229771 | A1* | 8/2018 | Sekine | B60K 1/04 |
| 2018/0257490 | A1* | 9/2018 | Imanishi | B60L 3/0053 |
| 2018/0281778 | A1* | 10/2018 | Zhang | B60W 20/40 |

FOREIGN PATENT DOCUMENTS

| | | |
|---|---|---|
| JP | 2007-242280 | 9/2007 |
| JP | 2012-85481 | 4/2012 |
| JP | 2013-017245 | 1/2013 |
| JP | 2014-083875 | 5/2014 |
| JP | 2014-113910 | 6/2014 |
| WO | WO 2012/049559 A2 | 4/2012 |

* cited by examiner

FUEL CELL VEHICLE AND METHOD OF MOUNTING POWER MODULE ON FUEL CELL VEHICLE

INCORPORATION BY REFERENCE

The disclosure of Japanese Patent Application No. 2016-050510 filed on Mar. 15, 2016 including the specification, drawings and abstract is incorporated herein by reference in its entirety.

BACKGROUND

1. Technical Field

The present disclosure relates to a fuel cell vehicle driven by a motor using a fuel cell as a power source, and a method of mounting a power module on the fuel cell vehicle.

2. Description of Related Art

In a hybrid vehicle driven by an internal combustion engine and a motor, a power control unit configured to control an operation of the motor is provided. The power control unit is mounted at a vehicle body side separated from an internal combustion engine in view of separation from vibrations of the internal combustion engine and commonization of a platform between a plurality of vehicle types including a non-hybrid vehicle. In the hybrid vehicle, a junction of power wiring (power supply wiring) from a secondary battery to an auxiliary machine is installed at the power control unit, and a compressor for an air conditioner may also be connected to the power control unit by the power wiring (for example, Japanese Patent Application Publication No. 2012-85481 (JP 2012-85481 A)).

The power control unit is disposed at an upper side of the vehicle in a height direction, and meanwhile, since the compressor for an air conditioner is a vibration source as well as a heavy article, in general, the compressor may be disposed under the internal combustion engine. Accordingly, after the internal combustion engine is mounted in an engine room of a vehicle body, connection of the power control unit and the compressor for an air conditioner using the power wiring frequently causes difficulties related to a work space. Meanwhile, in order to avoid the above-mentioned difficulties, when the power control unit and the compressor for an air conditioner are connected by the power wiring before the internal combustion engine is mounted in the engine room, the internal combustion engine should be mounted in the engine room in a state in which both of the power control unit and the compressor for an air conditioner connected by the power wiring are simultaneously held, and there is a risk of decreasing work efficiency. Further, this risk can occur not only when the engine room is disposed in the front of the vehicle body but also when it is located in the rear of the vehicle body.

Here, instead of a single wiring serving as the power wiring that connects the power control unit and the compressor for an air conditioner, a two-split wiring configured to connect two sets of power wirings at intermediate positions having good workability between the power control unit and the compressor for an air conditioner is considered. In this case, the internal combustion engine on which the compressor for an air conditioner, to which the one power wiring is connected, is mounted and the power control unit to which the other power wiring is connected are independently mounted in the engine room, and after the internal combustion engine and the power control unit are mounted in the engine room, the one power wiring and the other power wiring are connected to each other.

SUMMARY

However, when the two-split wiring is used, while workability of work of connecting the power control unit and the compressor for an air conditioner using the power wiring is improved, in order to realize connection at the intermediate position, two extra connectors (one set) that are heavy articles and cost more than the wiring portion should be provided in the power wiring. Accordingly, an increase in weight and an increase in cost may occur.

The increase in weight and cost generated when the power control unit and the compressor for an air conditioner are connected by the power wiring, in the fuel cell vehicle, instead of the internal combustion engine, may occur similarly when a high voltage apparatus for a fuel cell or a high voltage apparatus for a fuel cell and a fuel cell are mounted in the engine room (the power source room). In addition, sufficient review of efficiency of handling of the power wiring when the high voltage apparatus for a fuel cell or the high voltage apparatus for a fuel cell and the fuel cell are mounted in the engine room of the fuel cell vehicle has not been performed.

Accordingly, in the fuel cell vehicle, effective wiring of the power wiring in which work efficiency and cost reduction are compatible when the high voltage apparatus for a fuel cell or the high voltage apparatus for a fuel cell and the fuel cell are mounted in the power source room is needed.

The present disclosure can be realized as the following aspects.

A first aspect provides a fuel cell vehicle driven by a motor using a fuel cell as a power supply. The fuel cell vehicle according to the first aspect includes a high voltage apparatus for a fuel cell in front or behind a cabin of the fuel cell vehicle, a compressor for an air conditioner disposed under the high voltage apparatus for the fuel cell and constitutes a module integrated with the high voltage apparatus for the fuel cell, and a power control unit connected to the high voltage apparatus for the fuel cell by a power wiring, separated from the high voltage apparatus for the fuel cell, disposed at a vehicle body side of the fuel cell vehicle and configured to control an operation of the motor, wherein the compressor is not connected to the power control unit by the power wiring but connected to the high voltage apparatus for the fuel cell by a single power wiring.

According to the fuel cell vehicle according to the first aspect, in the fuel cell vehicle including the power control unit disposed at the vehicle body and configured to control the operation of the motor, the compressor constitutes the module integrated with the high voltage apparatus for the fuel cell, and is mounted on the fuel cell vehicle after connection to the high voltage apparatus for the fuel cell by the single power wiring. Accordingly, the power control unit and the compressor may not be connected by the power wiring after mounting, work efficiency can be improved, and further, cost reduction can be achieved without providing an extra connector because the single power wiring is used.

In the fuel cell vehicle according to the first aspect, the fuel cell may be disposed between the compressor and the high voltage apparatus for the fuel cell, and the high voltage apparatus for the fuel cell, the fuel cell and the compressor may constitute an integrated module. In this case, while a distance between the power control unit and the compressor is further increased, since the compressor in the module is connected to high voltage apparatus for the fuel cell by the single power wiring before the module is mounted on the vehicle body, in the fuel cell vehicle, work efficiency and cost reduction when the high voltage apparatus for the fuel cell and the fuel cell stack are mounted in the power source room are compatible.

The fuel cell vehicle according to the first aspect may further include a support member having an upper side to which the fuel cell is fixed and a lower side to which the compressor is fixed, and mounted on the vehicle body, and the high voltage apparatus for the fuel cell, the fuel cell and the compressor may constitute an integrated module due to the support member. In this case, the high voltage apparatus for the fuel cell and the compressor can be protected by the support member, and mounting of the high voltage apparatus for the fuel cell, the fuel cell and the compressor on the vehicle body can be facilitated through modularization with the support member.

In the fuel cell vehicle according to the first aspect, the motor may be disposed under the fuel cell, and the high voltage apparatus for the fuel cell, the fuel cell, the motor and the compressor may constitute an integrated module. In this case, the module including the motor can be mounted on the vehicle body.

The fuel cell vehicle according to the first aspect may further include a support member having an upper side to which the fuel cell is fixed and a lower side to which the compressor and the motor are fixed, and mounted on the vehicle body, and the high voltage apparatus for the fuel cell, the fuel cell, the motor and the compressor may constitute an integrated module due to the support member. The high voltage apparatus for the fuel cell, the motor and the compressor can be protected by the support member, and mounting of the high voltage apparatus for the fuel cell, the fuel cell, the motor and the compressor on the vehicle body can be facilitated through modularization with the support member.

In the fuel cell vehicle according to the first aspect, the high voltage apparatus for the fuel cell and the power control unit are connected by a single power wiring. Since the high voltage apparatus for the fuel cell and the power control unit are disposed at an upper side of the vehicle body, even after the module is mounted on the vehicle body, power wiring work can be easily performed with the single power wiring.

The fuel cell vehicle according to the first aspect further includes an electric heater disposed over the high voltage apparatus for the fuel cell, wherein the electric heater is connected to the power control unit by a single power wiring. Since the electric heater is disposed over the high voltage apparatus for the fuel cell, power wiring work can be easily performed with the single power wiring even when the module is mounted on the vehicle body.

The fuel cell vehicle according to the first aspect further includes a secondary battery, wherein the high voltage apparatus for the fuel cell includes a power junction, the secondary battery is connected to the power junction by a power wiring, and the power control unit and the compressor may be connected to the high voltage apparatus for the fuel cell by the power wiring via the power junction. In this case, compatibility of work efficiency and cost reduction when the high voltage apparatus for the fuel cell and the fuel cell stack are mounted in the power source room can be realized by the power junction, and power from the secondary battery can be distributed.

A second aspect provides a method of mounting a power module on a fuel cell vehicle. The method according to the second aspect includes mounting a compressor for an air conditioner in front of or behind a cabin of the fuel cell vehicle and under a support member; mounting a high voltage apparatus for the fuel cell over a support member; connecting the compressor and the high voltage apparatus for the fuel cell by a single power wiring; mounting the support member on which the compressor and the high voltage apparatus for the fuel cell are mounted on the vehicle body as the power module; and connecting between a power control unit and the high voltage apparatus for the fuel cell by a single power wiring, the power control unit being separated from the high voltage apparatus for the fuel cell, being disposed at a vehicle body side of the fuel cell vehicle, and being configured to control an operation of a motor.

According to the method of the second aspect, the support member is mounted on the vehicle body as the power module after the compressor for an air conditioner mounted under the support member and the high voltage apparatus for the fuel cell mounted on the support member are connected by the single power wiring, and the power control unit and the high voltage apparatus for the fuel cell are connected by the single power wiring, the power control unit being configured to control an operation of the motor therefore, being separated from the high voltage apparatus for the fuel cell, and being disposed at the vehicle body side of the fuel cell vehicle, therefore in the fuel cell vehicle, work efficiency and cost reduction when the high voltage apparatus for the fuel cell is mounted in the power source room are compatible. In addition, the high voltage apparatus for the fuel cell and the compressor can be protected by the support member.

In the method according to the second aspect, mounting the high voltage apparatus for the fuel cell over the support member may include mounting a fuel cell on the support member and mounting the high voltage apparatus for the fuel cell on the fuel cell, and mounting the support member on the vehicle body as the power module may include mounting the support member, on the vehicle body as the power module, the compressor, the fuel cell and the high voltage apparatus for the fuel cell being mounted on the support member. In this case, while a distance between the power control unit and the compressor is further increased, since the compressor and the high voltage apparatus for the fuel cell are connected by the single power wiring before the support member is mounted on the vehicle body, in the fuel cell vehicle, work efficiency and cost reduction when the high voltage apparatus for the fuel cell and the fuel cell are mounted in the power source room are compatible.

The method according to the second aspect may further include mounting the motor on a position different from that of the compressor under the support member, wherein mounting the support member on the vehicle body as the power module may include mounting the support member, on which the motor, the compressor, the fuel cell and the high voltage apparatus for the fuel cell are mounted, on the vehicle body as the power module. In this case, the high voltage apparatus for the fuel cell, the motor and the compressor can be protected by the support member, and the high voltage apparatus for the fuel cell, the fuel cell, the motor and the compressor can be mounted on the vehicle body at the same time by mounting the support member on the vehicle body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A fuel cell vehicle and a method of mounting a power module on the fuel cell vehicle according to the present disclosure will be described below.

Figure 1:
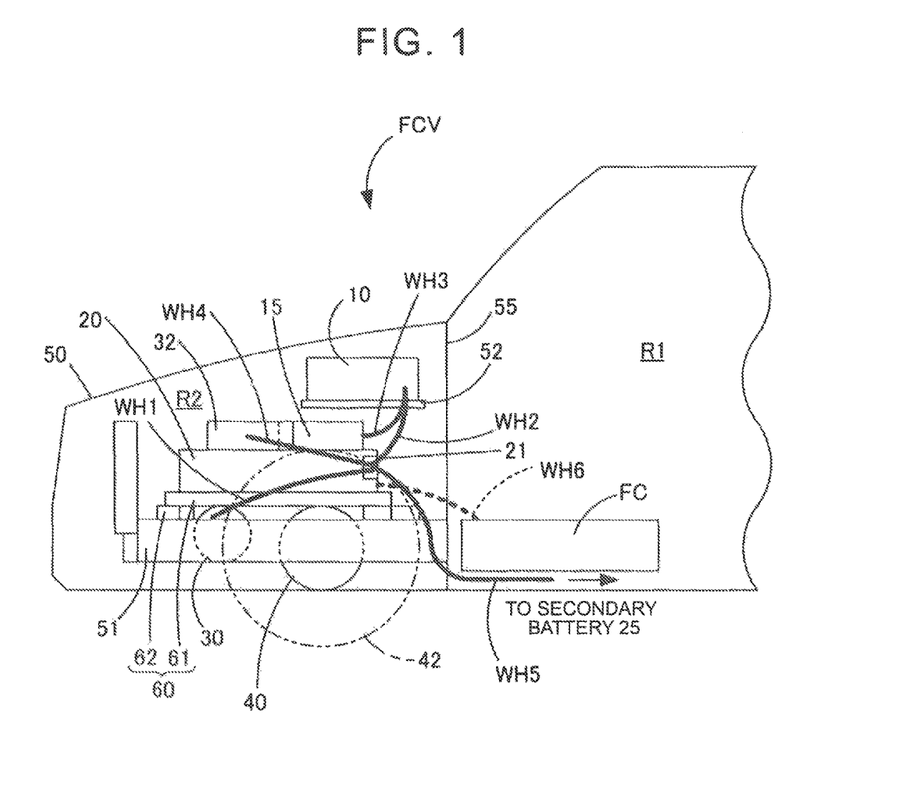
FIG. 1 is a view for schematically describing disposition of mounting apparatuses in a front room of a fuel cell vehicle according to a first embodiment when seen in a side view from a left side in an advance direction.
Figure 2:
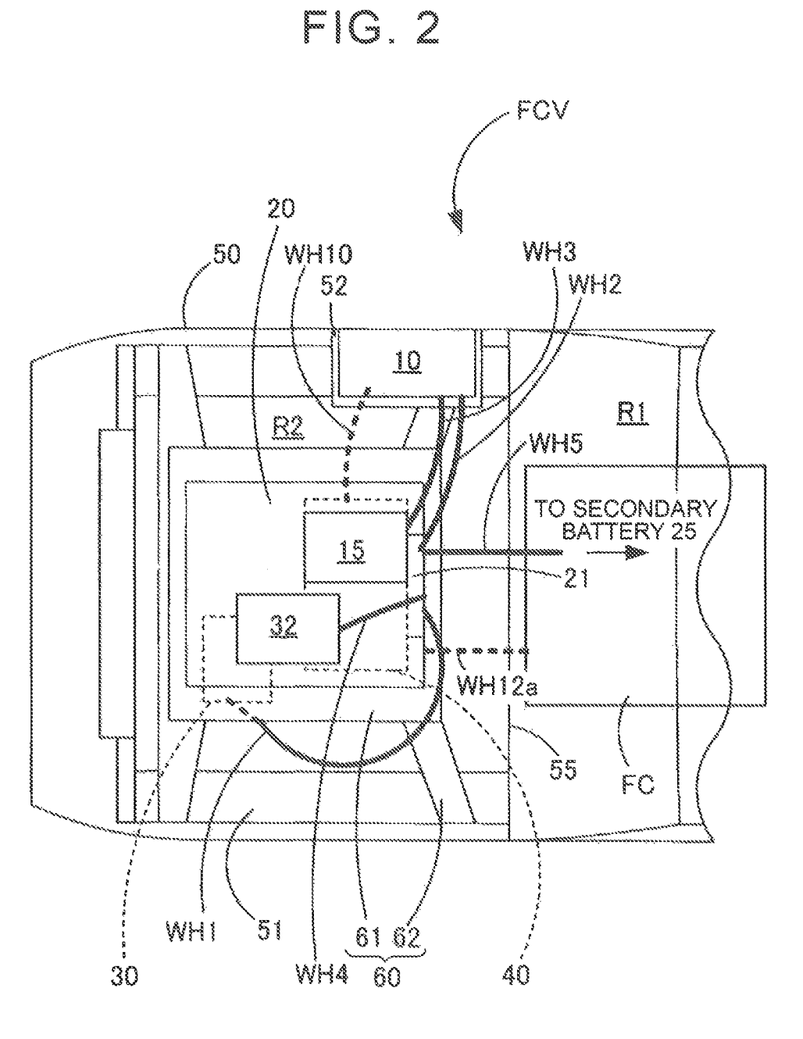
FIG. 2 is a view for schematically showing disposition of the mounting apparatuses in the front room of the fuel cell vehicle according to the first embodiment when seen in a plan view.

First embodiment: FIG. 1 is a view for schematically describing disposition of mounting apparatuses in a front room of a fuel cell vehicle according to a first embodiment when seen in a side view from a left side in an advance direction. FIG. 2 is a view for schematically describing disposition of the mounting apparatuses in the front room of the fuel cell vehicle according to the first embodiment when seen in a plan view. A fuel cell vehicle FCV has a front room R2 in front of a cabin R1. The front room R2 is a chamber which is referred to as an engine room in an internal combustion engine vehicle in which an internal combustion engine is mounted and a hybrid vehicle in which an internal combustion engine and a motor are mounted. Further, while the engine room is disposed at a center of the vehicle body (a mid-engine) or a rear side of the vehicle body (a rear engine) according to a mounting position of the internal combustion engine, in the embodiment, a front engine vehicle including an engine room in the front of the vehicle body will be described exemplarily. Further, since the internal combustion engine is not provided in the fuel cell vehicle, hereinafter, the room is referred to as a power source room.

The front room R2 is partitioned by a vehicle body 50 and a dash panel 55, and a front frame 51 extending in a forward/rearward direction along a side of the vehicle body and a mounting section 52 configured to mount a power control unit 10 are provided at the vehicle body 50 in the front room R2. The power control unit 10, a high voltage apparatus 20 for a fuel cell, a compressor 30 for an air conditioner, a motor 40 and a support member 60 are provided in the front room R2. In the first embodiment, the compressor 30 for an air conditioner is disposed under the high voltage apparatus 20 for a fuel cell, and the power control unit 10 is disposed over the compressor 30 for an air conditioner. More specifically, the high voltage apparatus 20 for a fuel cell is mounted on the support member 60, the compressor 30 for an air conditioner is mounted under the support member 60, and the power control unit 10 is mounted on the vehicle body 50 disposed above the support member 60. Further, in the specification, "over" and "under" mean relative positional relations regardless of whether there is contact between components in a vertical direction with respect to a road serving as a traveling surface, and "over" means an orientation separated from the traveling surface.

While a front wheel drive type vehicle in which the motor 40 is disposed at the front room R2 to drive a front wheel 42 has been exemplarily described in the first embodiment, the first embodiment can also be applied to a rear wheel drive type vehicle in which the motor 40 is disposed in the rear of the cabin R1 to drive a rear wheel, and in this case, the motor 40 is not in the front room R2. In addition, in the first embodiment, a fuel cell FC is disposed under the cabin R1. In the embodiment, for example, a solid polymer type fuel cell is used as the fuel cell FC, and a plurality of unit cells, in each of which a membrane electrode assembly is sandwiched between a pair of separators, are stacked in a housing having strength to prevent and reduce deformation and damage due to an external force.

The power control unit 10 is mounted on the mounting section 52 (the vehicle body side) prepared in the vehicle body 50. The mounting section 52 is disposed at an upper section in a height direction of the vehicle body 50, which is easily accessible from above, when a front hood installed in the front room R2 is opened. A common platform is used in the internal combustion engine vehicle, the hybrid vehicle and the fuel cell vehicle by commonization of the vehicle body (platform), and for example, the power control unit 10 is disposed at a position in the internal combustion engine vehicle at which the battery is mounted, which is an available space in the fuel cell vehicle, and disposed at the vehicle body 50 side. The power control unit 10 is a control device configured to control an operation of the motor 40 serving mainly as a three-phase alternating current motor, separated from the high voltage apparatus 20 for a fuel cell, and performs a power-run operation or a regeneration operation of the motor 40. The power control unit 10 includes, for example, a control unit, and an inverter for a motor and a converter for a secondary battery that are controlled by the control unit. The power control unit 10 is connected to the high voltage apparatus 20 for a fuel cell and the motor 40 by power wirings (power supply wirings) WH2 and WH10, and connected to a secondary battery 25 via the high voltage apparatus 20 for a fuel cell. The power control unit 10 boosts an output voltage of the secondary battery 25 to a drive voltage of the motor 40. The power control unit 10 converts direct current power from the fuel cell FC or the boosted secondary battery 25 into alternating current power to supply the converted power to the motor 40 upon power-run, and converts the alternating current power output from the motor 40 into direct current power upon regeneration and steps down the power to supply the stepped-down power to the secondary battery 25. The alternating current power upon regeneration may be used to drive an air compressor serving as an auxiliary machine of the fuel cell FC. A lithium ion battery, a nickel hydrogen battery and a capacitor can be used in the secondary battery 25. A direct current motor or another alternating current motor may be used as the motor 40.

The high voltage apparatus 20 for a fuel cell is a box-shaped apparatus for boosting an output voltage of the fuel cell FC to a predetermined voltage required to drive the motor 40, and includes a boosting converter in the housing. The high voltage apparatus 20 for a fuel cell and the fuel cell FC are connected by a power wiring WH6. The direct current power boosted in the high voltage apparatus 20 for a fuel cell is supplied to the power control unit 10, and converted into alternating current power to be supplied to the motor 40.

The high voltage apparatus 20 for a fuel cell includes an air compressor configured to supply air serving as an oxidation gas to a cathode of the fuel cell FC, a circulating pump configured to circulate hydrogen serving as a fuel gas in an anode of the fuel cell FC, and a pump inverter 32 configured to convert direct current power into alternating current power to drive a cooling liquid pump configured to circulate a cooling liquid in a cooling circuit of the fuel cell FC. The pump inverter 32 may be formed integrally with the high voltage apparatus 20 for a fuel cell. Further, the high voltage apparatus may include, for example, a boosting converter, an inverter for an air compressor, an inverter for a circulating pump, and an inverter for a cooling liquid pump.

The high voltage apparatus 20 for a fuel cell includes a power junction 21 configured to branch power of the secondary battery 25. The power control unit 10, the compressor 30 for an air conditioner and the secondary battery 25 are connected to the power junction 21 by power wirings WH2, WH1 and WH5. Further, in the specification, expression that the power wiring is connected to the high voltage apparatus 20 for a fuel cell means that the power wiring is connected to the power junction 21. That is, in comparison with the positional relation between the power junction 21 and another apparatus, the embodiment will be described using the high voltage apparatus 20 for a fuel cell.

An electric heater 15 is provided at an upper surface of the high voltage apparatus 20 for a fuel cell, and is connected to the power control unit 10 via a power wiring WH3. The electric heater 15 is a heater configured to generate heat by supplying current to a heat element, and used as a heat source configured to heat the cabin R1.

The compressor 30 for an air conditioner compresses a coolant for an air conditioner in the cabin R1. The compressor 30 for an air conditioner is connected to the high voltage apparatus 20 for a fuel cell (the power junction 21) by the single power wiring WH1, and receives power via the high voltage apparatus 20 for a fuel cell. The compressor 30 for an air conditioner includes an inverter, and the direct current power supplied from the secondary battery 25 via the high voltage apparatus 20 for a fuel cell is converted into alternating current power by the inverter to be supplied to an alternating current motor configured to drive the compressor 30 for an air conditioner.

The support member 60 includes a plate-shaped support panel 61 and two support frames 62 disposed under front and rear end sides of the support panel 61. The high voltage apparatus 20 for a fuel cell is fixed to an upper surface of the support panel 61, and the motor 40 and the compressor 30 for an air conditioner are suspended and fixed to a lower surface of the support panel 61. That is, in the first embodiment, the compressor 30 for an air conditioner, the support panel 61 and the high voltage apparatus 20 for a fuel cell are stacked in sequence from a lower side of the vehicle body 50 in the height direction (a road surface side), and the high voltage apparatus 20 for a fuel cell is disposed at a highest position in the height direction. Further, the support frames 62 may be leg-shaped frames extending in the vertical direction to increase a capacity of a space under the support panel 61, and as shown, may be thin plate-shaped frames in the vertical direction. Hereinafter, an apparatus for forming an integrated module of the high voltage apparatus 20 for a fuel cell, the compressor 30 for an air conditioner and the motor 40 is generally referred to as a mounting module, and an integrated module formed by mounting the mounting module on the support member 60 is referred to as a power module. Here, the integrated module is a configuration body (an assembled body) in which components are coupled or assembled and integrally treated. The mounting module is disposed in a footprint of the support member 60 (the support panel 61).

Figure 3:
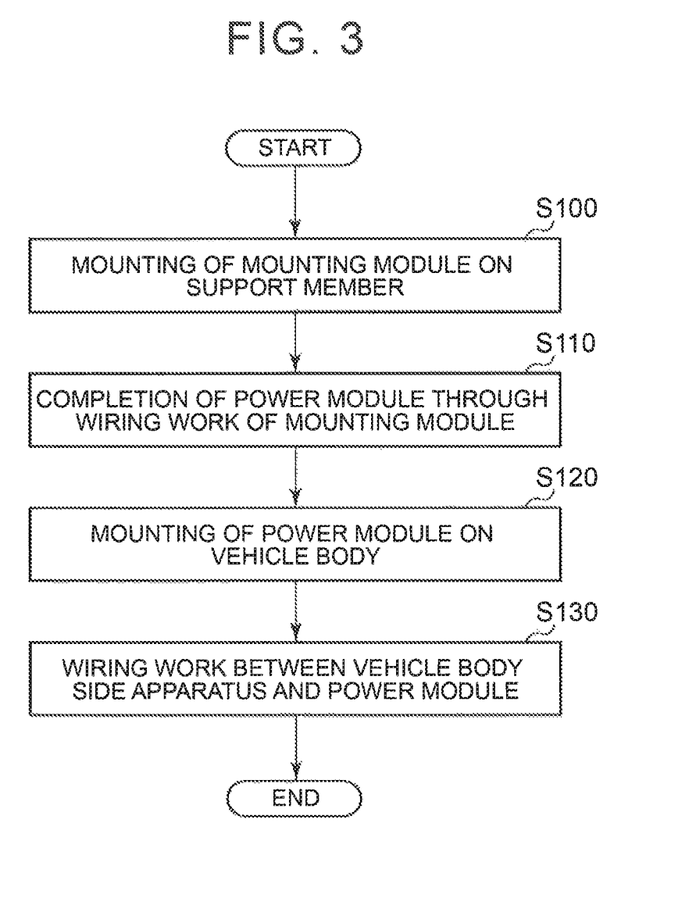
FIG. 3 is a flowchart showing a process of mounting a power module on a vehicle body.

A process of mounting the power module in the front room R2 of the vehicle body 50 will be described. FIG. 3 is a flowchart showing the process of mounting the power module on the vehicle body. The mounting module is mounted on the support panel 61 (the support member 60) (step S100). Specifically, the high voltage apparatus 20 for a fuel cell is mounted on an upper surface of the support panel 61, and the electric heater 15 and the pump inverter 32 are mounted on an upper surface of the high voltage apparatus 20 for a fuel cell. Meanwhile, the motor 40, the compressor 30 for an air conditioner, the air compressor, the circulating pump, and the cooling liquid pump are mounted on a lower surface of the support panel 61. In the mounting module (the power module), the high voltage apparatus 20 for a fuel cell is disposed at a highest position in the height direction. Mounting of the apparatuses on the support panel 61 is performed using welding, an appropriate fastener such as a bolt, a nut or a rivet, and an appropriate mounting auxiliary member such as a mounting holder or a mounting piece.

When the mounting module is mounted on the support panel 61, wiring work of the mounting module is performed, and the power module is completed by terminating assembly of the power module (step S110). Specifically, work of connecting connectors of the power wirings between the mounting modules is performed. Further, the compressor 30 for an air conditioner is connected to the high voltage apparatus 20 for a fuel cell (the power junction 21) using the single power wiring WH1. In this step, since the work is possible from an arbitrary direction and angle with respect to the mounting module, the wiring work can be easily performed without receiving an influence of the mounting positions (the disposed positions) of the apparatuses.

The power module is mounted on the vehicle body 50 (step S120). Specifically, the support frames 62 of the support member 60 are disposed at the front frame 51 of the vehicle body 50 and fastened thereto by a predetermined fastening method. Examples of the predetermined fastening method include welding, a fixing method using an appropriate fastener such as a bolt or a nut, and a fixing method using an appropriate mounting auxiliary member such as a damper in which a liquid is sealed.

The wiring work between the apparatuses previously mounted on the vehicle body 50 and the apparatuses included in the power module is performed (step S130) to terminate the mounting work. Various kinds of apparatuses are previously mounted on the vehicle body 50, and for example, the power control unit 10 is mounted on the mounting section 52. The power control unit 10 is connected to the high voltage apparatus 20 for a fuel cell by the power wiring WH2, and connected to the electric heater 15 by the power wiring WH3. While the power control unit 10 is disposed at the upper section of the vehicle body 50, since the high voltage apparatus 20 for a fuel cell is disposed on the support panel 61 above the compressor 30 for an air conditioner and the electric heater 15 is disposed at the upper surface of the high voltage apparatus 20 for a fuel cell, the wiring work thereof can be easily performed.

Figure 4:
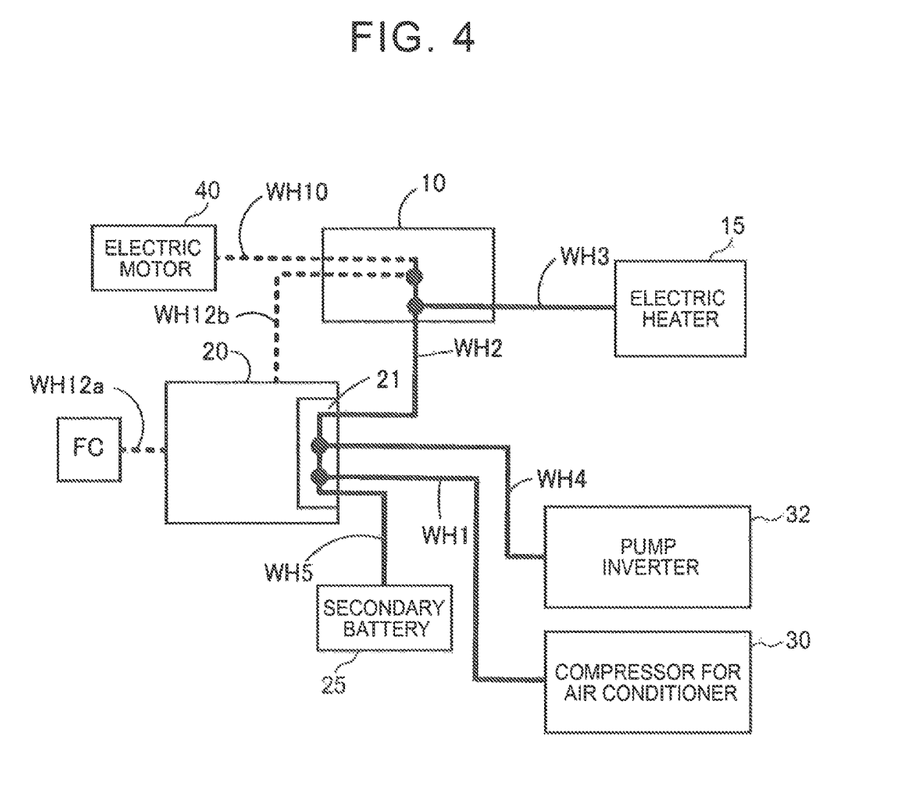
FIG. 4 is a view for schematically describing a power wiring between the apparatuses provided in the fuel cell vehicle.

A connection relation of the power wirings between the apparatuses will be described. FIG. 4 is a view for schematically describing the power wiring between the apparatuses included in the fuel cell vehicle. As described above, the power junction 21 is provided in the high voltage apparatus 20 for a fuel cell. The secondary battery 25 serving as the power source is connected to the power junction 21 via a power wiring WH5, the compressor 30 for an air conditioner driven by the power is connected to the power junction 21 via the power wiring WH1, and the pump inverter 32 is connected to the power junction 21 via a power wiring WH4. Further, the power control unit 10 configured to drive and control the motor 40 using power of the secondary battery 25 is connected to the power junction 21 via the power wiring WH2. In these power wirings, wiring work of the power wirings WH1 and WH4 is performed when the compressor 30 for an air conditioner and the pump inverter 32 are mounted on the support member 60. Wiring work of the power wirings WH2 and WH5 between the power control unit 10 and the power junction 21 and between the secondary battery 25 and the power junction 21 is performed after the power module is mounted on the vehicle body 50. The electric heater 15 is connected to the power control unit 10 via the power wiring WH3.

The power control unit 10 and the motor 40 are connected by the power wiring WH10. While the motor 40 is disposed under the support member 60, since the power wiring WH10 is a main power wiring of the vehicle body 50, workability after the power module is mounted in the front room R2 is considered. The fuel cell FC is connected to the high voltage apparatus 20 for a fuel cell via a power wiring WH12a, and the high voltage apparatus 20 for a fuel cell is connected to the power control unit 10 by a power wiring WH12b. Wiring work of the power wiring WH12b can be performed under good workability similar to the power wiring WH2.

According to the fuel cell vehicle FCV of the above-mentioned first embodiment, a configuration in which the high voltage apparatus 20 for a fuel cell and the compressor 30 for an air conditioner are treated as the mounting module, and the power wiring is performed with respect to the compressor 30 for an air conditioner from the high voltage apparatus 20 for a fuel cell instead of the power control unit 10 mounted on the vehicle body 50 is provided. Accordingly, before the support member 60 (the power module) on which the mounting module is mounted is mounted on the vehicle body 50, the power wiring between the high voltage apparatus 20 for a fuel cell and the compressor 30 for an air conditioner can be completed from an arbitrary angle and position, and a degree of freedom of the wiring work can be improved. That is, after the high voltage apparatus 20 for a fuel cell and the compressor 30 for an air conditioner are mounted on the vehicle body 50, the power control unit 10 disposed at an upper side of the vehicle body 50 and the compressor 30 for an air conditioner disposed at a lower side of the vehicle body 50 may not be connected by the power wiring. As a result, the high voltage apparatus 20 for a fuel cell and the compressor 30 for an air conditioner can be connected by the single power wiring WH1, and unlike the related art requiring a plurality of sets of connectors and using the plurality of power wirings, it is possible to achieve reduction in weight and reduction in cost of the power wiring in which one set of connectors is sufficient.

In an aspect of the power wiring in the fuel cell vehicle FCV according to the first embodiment, a platform in common with the vehicle of the related art such as the internal combustion engine vehicle and the hybrid vehicle in which the power control unit is generally provided at the vehicle body can also be used in the fuel cell vehicle FCV. Accordingly, reduction in cost of the power wiring can be achieved while achieving improvement of a degree of freedom of the wiring work and reduction in cost of the vehicle.

According to the fuel cell vehicle FCV of the first embodiment, since the high voltage apparatus 20 for a fuel cell is disposed in the footprint of the support member 60, even when a force from the outside due to collision or the like is received, damage to the high voltage apparatus 20 for a fuel cell can be suppressed or prevented by the support member 60. In addition, like the motor 40 and the compressor 30 for an air conditioner, damage caused by a force applied from the outside due to collision or the like can be prevented or reduced by the support member 60.

According to the fuel cell vehicle FCV of the first embodiment, the high voltage apparatus 20 for a fuel cell, and the compressor 30 for an air conditioner as well as the other auxiliary machine are previously mounted on the support member 60 as the mounting module and integrated as the power module. Accordingly, these apparatuses can be mounted on the vehicle body 50 together, the wiring work or the like can be previously performed in the mounting module, and mounting of the mounting module on the vehicle body 50 can be facilitated.

Figure 5:
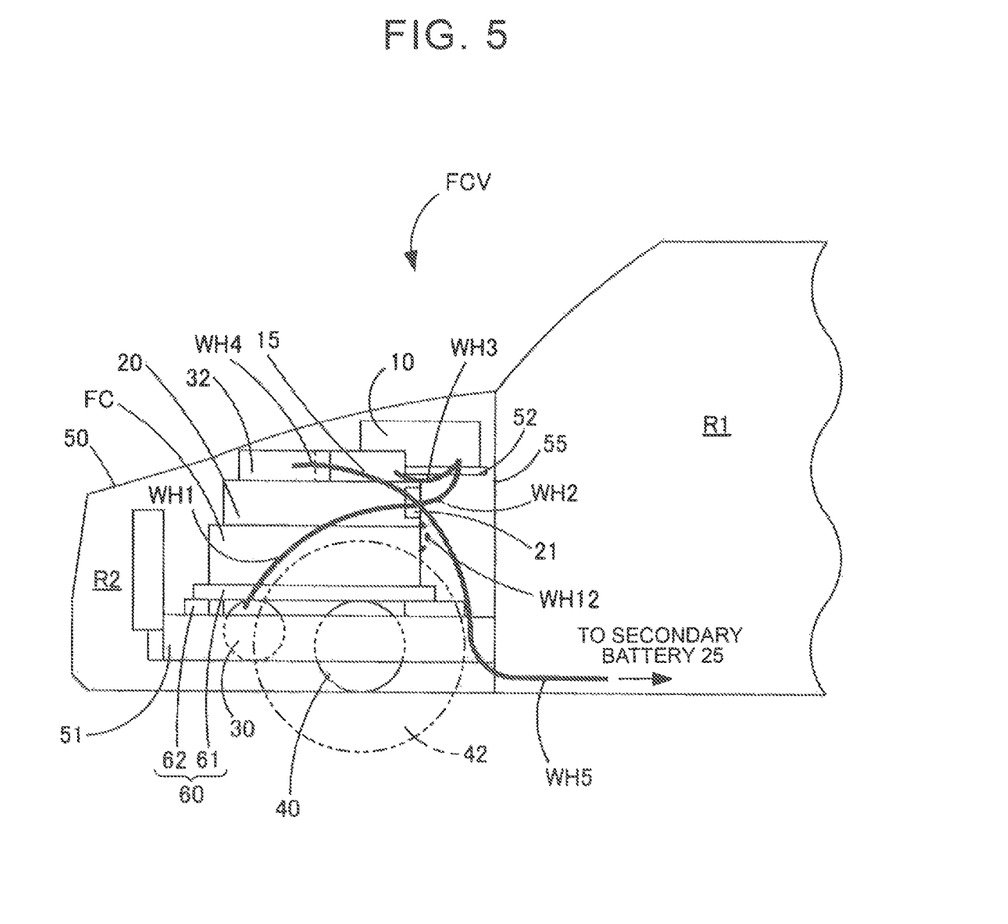
FIG. 5 is a view for schematically describing disposition of mounting apparatuses in a front room of a fuel cell vehicle according to a second embodiment when seen in a side view from a left side of an advance direction.
Figure 6:
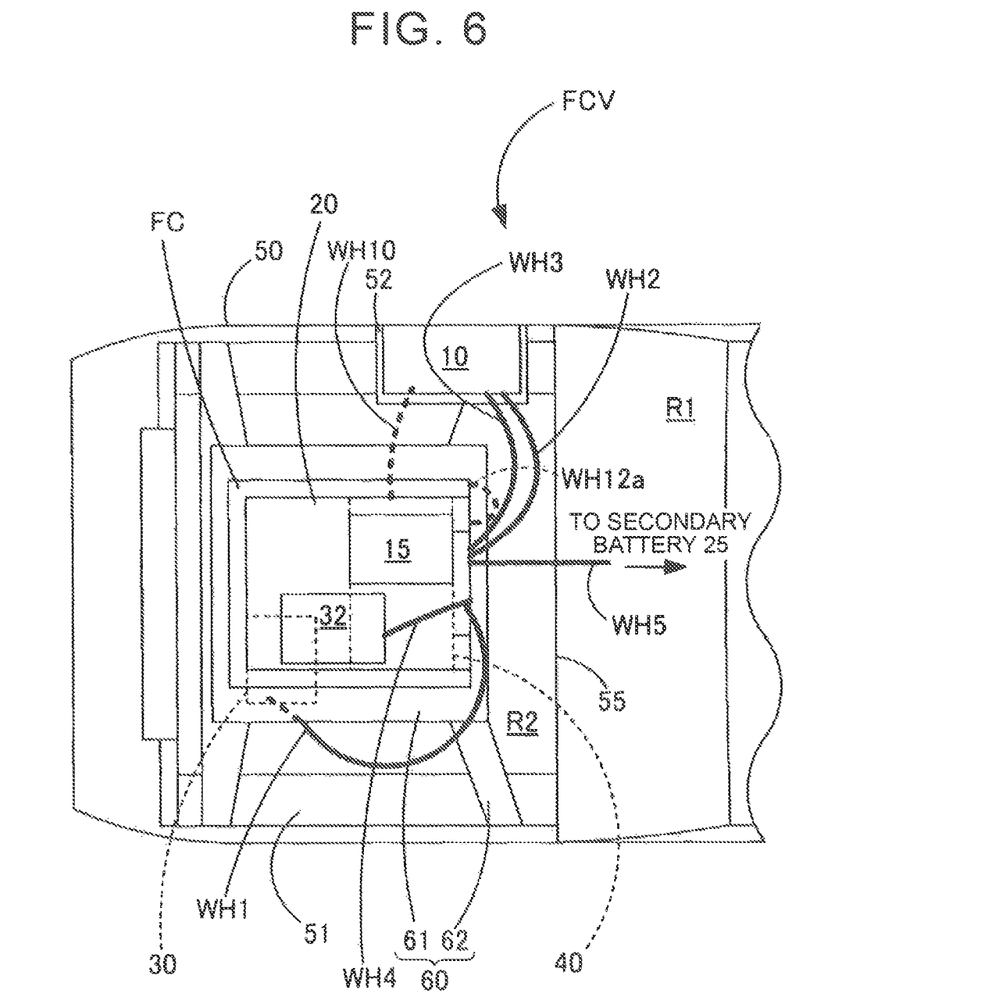
FIG. 6 is a view for schematically describing disposition of the mounting apparatuses in the front room of the fuel cell vehicle according to the second embodiment when seen in a plan view.

Second embodiment: FIG. 5 is a view schematically describing disposition of mounting apparatuses in a front room of a fuel cell vehicle according to a second embodiment when seen in a side view from a left side in an advance direction. FIG. 6 is a view schematically describing disposition of the mounting apparatuses in the front room of the fuel cell vehicle according to the second embodiment when seen in a plan view. In the first embodiment, while the fuel cell FC is disposed under the cabin R1, in the second embodiment, the fuel cell FC is disposed between the high voltage apparatus 20 for a fuel cell and the support panel 61. Since the other configurations of the second embodiment are the same as the configurations of the first embodiment, the same reference numerals are designated for those configurations and detailed description thereof will be omitted.

In the second embodiment, the fuel cell FC is disposed between the high voltage apparatus 20 for a fuel cell and the compressor 30 for an air conditioner. That is, the compressor 30 for an air conditioner, the fuel cell FC and the high voltage apparatus 20 for a fuel cell are disposed upward in sequence. More specifically, the fuel cell FC is disposed between the high voltage apparatus 20 for a fuel cell and the support member 60 (the support panel 61).

The fuel cell FC is fixed to the upper surface of the support panel 61, and the high voltage apparatus 20 for a fuel cell is fixed to the upper surface of the fuel cell FC. The motor 40 and the compressor 30 for an air conditioner are suspended and fixed to a lower surface of the support panel 61. Further, the support frames 62 may be leg-shaped frames extending in the vertical direction to increase a capacity of a space below the support panel 61, and as shown, may also be thin plate-shaped frames in the vertical direction.

The compressor 30 for an air conditioner is connected to the high voltage apparatus 20 for a fuel cell via the single power wiring WH1. Further, in the other power wiring, like the first embodiment, the power wiring is connected between the apparatuses.

Mounting of the power module in the front room R2 of the vehicle body 50 will be described with reference to FIG. 3 focusing on differences from the first embodiment. In step S100, the mounting module in which the fuel cell FC is added to the mounting module of the first embodiment is mounted on the support panel 61 (the support member 60). Specifically, the fuel cell FC is mounted on the upper surface of the support panel 61, the high voltage apparatus 20 for a fuel cell is mounted on the upper surface of the fuel cell FC, and the electric heater 15 and the pump inverter 32 are mounted on the upper surface of the high voltage apparatus 20 for a fuel cell.

In step S110, the power wirings in the mounting module are connected. The compressor 30 for an air conditioner is connected to the high voltage apparatus 20 for a fuel cell (the power junction 21) using the single power wiring WH1 with the fuel cell FC sandwiched therebetween, and further, the power wiring WH12a is also connected between the fuel cell FC and the high voltage apparatus 20 for a fuel cell in this step. In the second embodiment, while the fuel cell FC is further stacked as the mounting module and a distance in the vertical direction between the high voltage apparatus 20 for a fuel cell and the compressor 30 for an air conditioner is increased, since the work on the mounting module (the power module) before mounting on the vehicle body 50 from an arbitrary direction and angle is possible, the wiring work can be easily performed.

The power module is mounted on the vehicle body 50 (step S120), the wiring work between the apparatuses previously mounted on the vehicle body 50 and the apparatuses included in the power module is performed (step 130), and the mounting work of the power module on the vehicle body 50 is terminated. The power control unit 10 mounted on the vehicle body 50 is connected to the high voltage apparatus 20 for a fuel cell via the power wiring WH2, and connected to the electric heater 15 via the power wiring WH3. While the power control unit 10 is disposed at the upper side of the vehicle body 50, since the high voltage apparatus 20 for a fuel cell is disposed on the support panel 61 over the compressor 30 for an air conditioner and the electric heater 15 is disposed on the upper surface of the high voltage apparatus 20 for a fuel cell, the wiring work can be easily performed.

The power wiring between the apparatuses is the same as in the first embodiment. In the second embodiment, in the power wiring WH12a between the fuel cell FC and the high voltage apparatus 20 for a fuel cell, wiring is performed before the mounting module (the power module) is mounted on the vehicle body 50.

According to the fuel cell vehicle FCV of the above-mentioned second embodiment, even when the fuel cell FC is included and the mounting module having a larger dimension in the vertical direction is provided, since the configuration in which the power wiring is performed on the compressor 30 for an air conditioner from the high voltage apparatus 20 for a fuel cell is provided, before the mounting module is mounted on the vehicle body 50, the high voltage apparatus 20 for a fuel cell and the compressor 30 for an air conditioner can be connected by the single power wiring WH1. Accordingly, after the mounting module is mounted on the vehicle body, the wiring work using the plurality of sets of power wirings in the technique of the related art in which the power control unit mounted on the upper side of the vehicle body and the compressor for an air conditioner disposed under the mounting module are wired and connected is not needed. As a result, reduction in weight and reduction in cost of the power wiring can be achieved.

According to the fuel cell vehicle FCV of the second embodiment, since the high voltage apparatus 20 for a fuel cell, the motor 40 and the auxiliary machine including the fuel cell FC and the compressor 30 for an air conditioner are integrally mounted on the support member 60, these can be easily treated as one power module. For example, in the vehicle in which the internal combustion engine is mounted, it is sufficient to mount the power module in the engine room instead of the internal combustion engine without making an additional mounting space for the fuel cell vehicle FCV, and the vehicle body (the platform) can be easily shared in the internal combustion engine vehicle, the hybrid vehicle and the fuel cell vehicle.

According to the second embodiment, since the high voltage apparatus 20 for a fuel cell is disposed in the footprint of the support member 60 together with the fuel cell FC, even when a force from the outside due to collision or the like is received, damage to the high voltage apparatus 20 for a fuel cell can be suppressed or prevented by the support member 60 and the housing of the fuel cell FC. In addition, like the motor 40 and the compressor 30 for an air conditioner, damage caused by an active force from the outside due to collision or the like can be prevented or reduced by the support member 60 and the fuel cell FC.

Further, according to the fuel cell vehicle FCV of the second embodiment, other technical effects similar to those of the fuel cell vehicle FCV according to the first embodiment can be obtained.

MODIFIED EXAMPLES (1) First Modified Example

Figure 7:
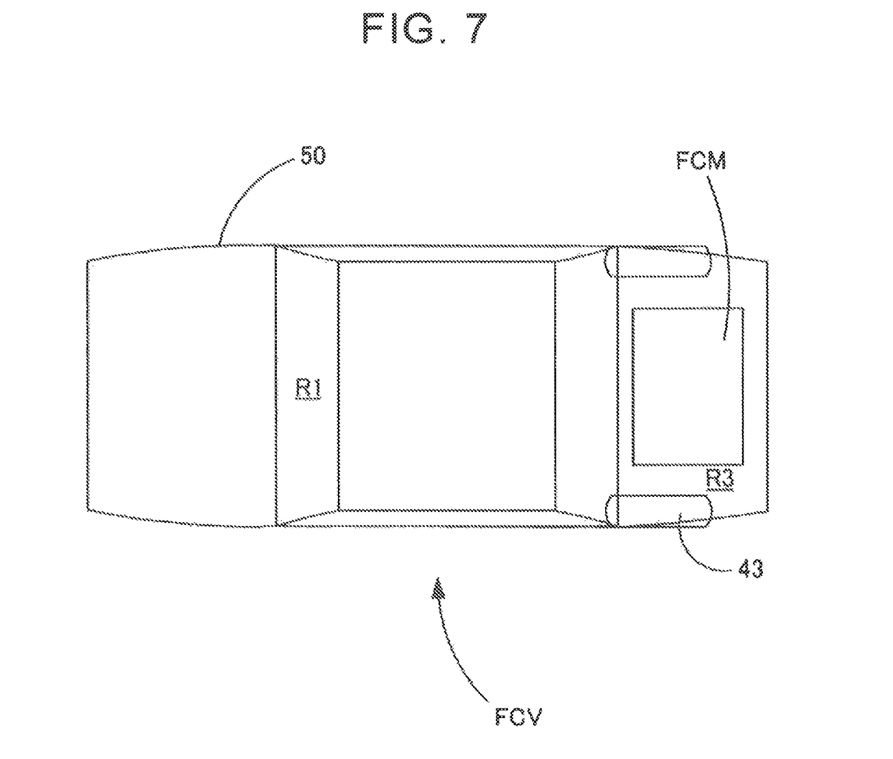
FIG. 7 is a schematic configuration view of a fuel cell vehicle including a power module according to a first modified example in a rear room.
Figure 8:
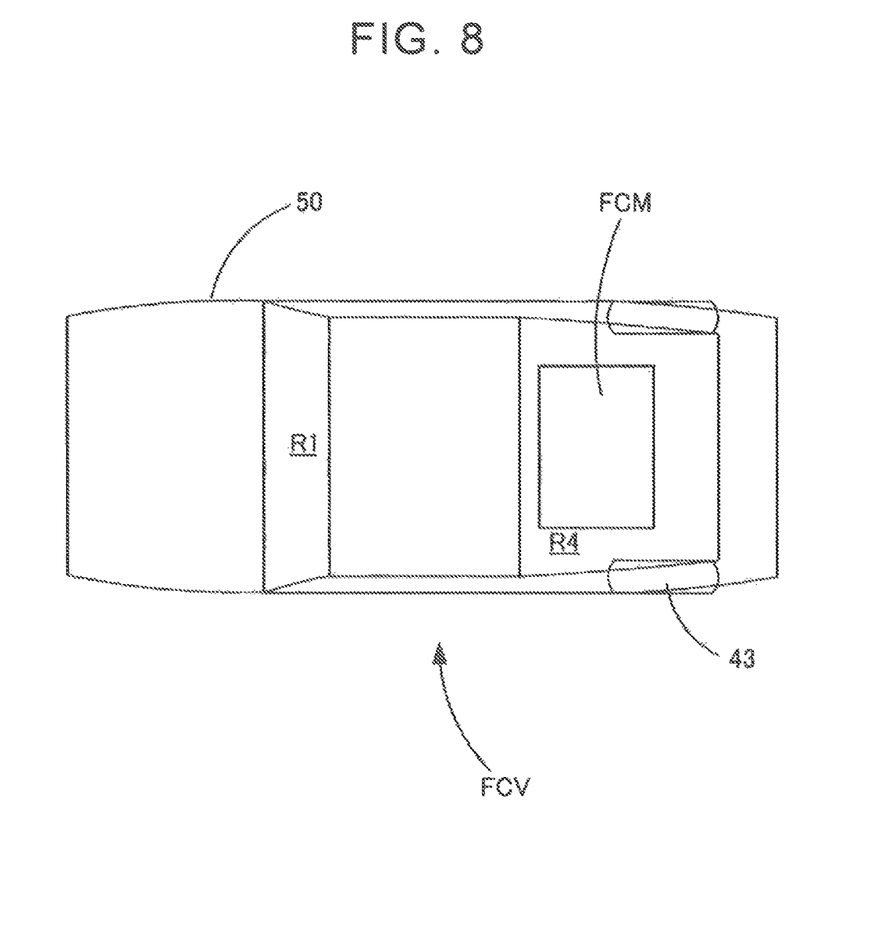
FIG. 8 is a schematic configuration view of a fuel cell vehicle including the power module according to the first modified example in a mid-room.

While the case in which the power module FCM is installed in the front room R2 has been described in the first and second embodiments, as shown in FIG. 7 and FIG. 8, a power module FCM may be installed in a rear room R3 in the vicinity of rear wheels 43 behind the cabin R1 or may be installed in a mid-room R4 between the rear wheels 43 and the cabin R1. FIG. 7 is a schematic configuration view of a fuel cell vehicle including the power module in the rear room. FIG. 8 is a schematic configuration view of a fuel cell vehicle including the power module in the mid-room. The same technical effects as in the first and second embodiments can be obtained in these cases.

(2) Second Modified Example

While the motor 40 is included in the mounting module (the power module) In the first and second embodiments because the front wheel drive vehicle is exemplarily described, the motor 40 may not be included in the case of the rear wheel drive vehicle. That is, in the case of the rear wheel drive vehicle, the motor 40 is installed at the rear wheel side. Even in this case, various technical effects can be obtained by connecting the high voltage apparatus 20 for a fuel cell and the compressor 30 for an air conditioner that are integrated as the mounting module using the single power wiring WH1. That is, at least the high voltage apparatus 20 for a fuel cell and the compressor 30 for an air conditioner may be integrated as the mounting module, and further, the fuel cell FC, the motor 40 and the other auxiliary machines may also be integrated.

(3) Third Modified Example

While the power module is configured using the support member 60 in the first and second embodiments, the power module may also be configured without using the support member 60. That is, the power module may also be configured by directly coupling the apparatuses that constitute the mounting module without using the support member 60. For example, the mounting section configured to mount the motor 40 and the compressor 30 for an air conditioner may be formed on the lower surface of the housing of the fuel cell FC such that the high voltage apparatus 20 for a fuel cell is also mounted on the upper surface of the housing of the fuel cell FC, or the mounting section configured to mount the motor 40 and the compressor 30 for an air conditioner may also be formed on the lower surface of the high voltage apparatus 20 for a fuel cell. The power module configured as described above is prepared in the vehicle body 50, or mounted on the vehicle body 50 via a separate attachment member. Further, the compressor 30 for an air conditioner, the high voltage apparatus 20 for a fuel cell and the fuel cell FC may also be mounted on an attachment frame provided on the motor 40. In this case, the compressor 30 for an air conditioner, the high voltage apparatus 20 for a fuel cell and the fuel cell FC may be mounted on the vehicle body 50 without requiring a novel attachment member.

While the present disclosure has been described above based on the examples and modified examples, the above-mentioned embodiments of the present disclosure are provided to facilitate understanding of the present disclosure but are not limiting thereto. The present disclosure may be modified and improved without departing from the spirit of the present disclosure and the scope of the claims, and equivalents thereof are included in the present disclosure. For example, technical features in the embodiment and the modified examples corresponding to technical features in the aspects disclosed in paragraphs of the summary of the present disclosure may be appropriately substituted or assembled to solve some or all of the above-mentioned problems or achieve some or all of the above-mentioned effects. In addition, the technical features may be appropriately deleted unless the technical features are described as essential features in the specification.

What is claimed is:

1. A fuel cell vehicle driven by a motor using a fuel cell as a power supply, the fuel cell vehicle comprising, in front of or behind a cabin of the fuel cell vehicle:
    a high voltage apparatus for the fuel cell;
    a compressor for an air conditioner; and
    a power control unit, wherein
    the compressor is disposed under the high voltage apparatus for the fuel cell and constitutes a module integrated with the high voltage apparatus for the fuel cell,
    the power control unit is connected to the high voltage apparatus for the fuel cell by a power wiring, is a member separated from the high voltage apparatus for the fuel cell, is disposed at a vehicle body side of the fuel cell vehicle, and controls an operation of the motor, and
    the compressor is not connected to the power control unit by the power wiring but connected to the high voltage apparatus for the fuel cell by a single power wiring.

2. The fuel cell vehicle according to claim 1, wherein the fuel cell is disposed between the compressor and the high voltage apparatus for the fuel cell, and
    the high voltage apparatus for the fuel cell, the fuel cell and the compressor constitute an integrated module.

3. The fuel cell vehicle according to claim 2, further comprising:
    a support member having an upper side to which the fuel cell is fixed and a lower side to which the compressor is fixed, and mounted on the vehicle body,
    wherein the high voltage apparatus for the fuel cell, the fuel cell and the compressor constitute an integrated module due to the support member.

4. The fuel cell vehicle according to claim 2, wherein the motor is disposed under the fuel cell, and
    the high voltage apparatus for the fuel cell, the fuel cell, the motor and the compressor constitute an integrated module.

5. The fuel cell vehicle according to claim 4, further comprising:
    a support member having an upper side to which the fuel cell is fixed and a lower side to which the compressor and the motor are fixed, and mounted on the vehicle body,
    wherein the high voltage apparatus for the fuel cell, the fuel cell, the motor and the compressor constitute an integrated module due to the support member.

6. The fuel cell vehicle according to claim 1, wherein the high voltage apparatus for the fuel cell and the power control unit are connected by a single power wiring.

7. The fuel cell vehicle according to claim 1, further comprising:
    an electric heater disposed over the high voltage apparatus for the fuel cell,
    wherein the electric heater is connected to the power control unit by a single power wiring.

8. The fuel cell vehicle according to claim 1, further comprising:
    a secondary battery,
    wherein the high voltage apparatus for the fuel cell includes a power junction,
    the secondary battery is connected to the power junction by a power wiring, and
    the power control unit and the compressor are connected to the high voltage apparatus for the fuel cell by the power wiring via the power junction.

9. A method of mounting a power module on a fuel cell vehicle, comprising, in front of or behind a cabin of the fuel cell vehicle
    mounting a compressor for an air conditioner under a support member;
    mounting a high voltage apparatus for the fuel cell over a support member;
    connecting the compressor and the high voltage apparatus for the fuel cell by a single power wiring;
    mounting the support member on which the compressor and the high voltage apparatus for the fuel cell are mounted on a vehicle body as the power module; and
    connecting between a power control unit and the high voltage apparatus for the fuel cell by a single power wiring, the power control unit being separated from the high voltage apparatus for the fuel cell, being disposed at a vehicle body side of the fuel cell vehicle, and being configured to control an operation of a motor.

10. The mounting method according to claim 9, wherein mounting the high voltage apparatus for the fuel cell over the support member includes mounting a fuel cell on the support member and mounting the high voltage apparatus for the fuel cell on the fuel cell, and
    mounting the support member on the vehicle body as the power module includes mounting the support member on the vehicle body as the power module, the compressor, the fuel cell and the high voltage apparatus for the fuel cell being mounted on the support member.

11. The mounting method according to claim 10, further comprising;

mounting the motor on a position different from a position of the compressor under the support member, wherein mounting the support member on the vehicle body as the power module includes mounting the support member on the vehicle body as the power module, the motor, the compressor, the fuel cell and the high voltage apparatus for the fuel cell being mounted the support member.

* * * * *